United States Patent
Abed et al.

(10) Patent No.: US 11,543,119 B2
(45) Date of Patent: Jan. 3, 2023

(54) PORTABLE DIFFUSED LIGHTING SYSTEM

(71) Applicant: Brightside Innovations LLC, San Jose, CA (US)

(72) Inventors: Tark Abed, San Jose, CA (US); Michael Thayer Drez, Palm Desert, CA (US)

( * ) Notice: Subject to any disclaimer, the term of this patent is extended or adjusted under 35 U.S.C. 154(b) by 0 days.

(21) Appl. No.: 17/554,433

(22) Filed: Dec. 17, 2021

(65) Prior Publication Data
US 2022/0196234 A1 Jun. 23, 2022

Related U.S. Application Data

(60) Provisional application No. 63/129,121, filed on Dec. 22, 2020.

(51) Int. Cl.
*F21V 33/00* (2006.01)
*G02B 5/02* (2006.01)
*F21Y 115/10* (2016.01)

(52) U.S. Cl.
CPC ........ *F21V 33/0052* (2013.01); *G02B 5/0278* (2013.01); *F21Y 2115/10* (2016.08); *G06F 2213/0042* (2013.01)

(58) Field of Classification Search
CPC ...... F21V 33/0052; F21V 14/08; F21V 3/023; F21V 21/22
See application file for complete search history.

(56) References Cited

U.S. PATENT DOCUMENTS

| | | | | |
|---|---|---|---|---|
| 5,311,409 A | * | 5/1994 | King | G03B 15/06 362/17 |
| 9,605,813 B2 | * | 3/2017 | Collias | F21V 17/02 |
| D895,716 S | * | 9/2020 | Chen | D16/244 |
| D899,491 S | * | 10/2020 | Chen | D16/244 |
| 2012/0243200 A1 | * | 9/2012 | Sutton | G03B 15/02 362/11 |

(Continued)

OTHER PUBLICATIONS

Amazon.Com, USB 2.0 A Male to 2 Dual USB female jack Y splitter hub Power cord extension adapter cable, Apr. 20, 2018, Amazon.com (Year: 2018).*

(Continued)

*Primary Examiner* — Eric T Eide
(74) *Attorney, Agent, or Firm* — Snell & Wilmer L.L.P.; Kent A. Lembke

(57) ABSTRACT

A portable diffused lighting system is disclosed. The lighting system includes a collapsible containment and a light source. The containment includes a perimeter wall, a first end, and a light diffuser, with the first end including the light diffuser, with the containment being disposable in a collapsed configuration and at least one expanded configuration, and with a maximum expanded configuration for the containment providing a maximum spacing of no more than about 4 inches between the light source and the light diffuser. The light source projects within an interior of the collapsible containment, and diffused light is output from the containment through the light diffuser. The lighting system may include a connector for detachably mounting the lighting system to a computer display panel. The lighting system may also include a boom stand, and the noted connector may also detachably mount the containment to the boom stand.

22 Claims, 16 Drawing Sheets

(56) References Cited

U.S. PATENT DOCUMENTS

| | | | | |
|---|---|---|---|---|
| 2017/0184255 A1* | 6/2017 | Wang | ................ | F21K 9/66 |
| 2017/0198873 A1* | 7/2017 | Ashmore | ................ | F21V 29/70 |
| 2019/0257479 A1* | 8/2019 | Horne | ................ | F21V 21/08 |
| 2021/0364676 A1* | 11/2021 | Zhang | ................ | B29B 7/90 |
| 2022/0010945 A1* | 1/2022 | Teichman | ................ | F21V 14/06 |

OTHER PUBLICATIONS

Small LED Panel Light Panel—The Panel Mini | Lume Cube, Inc. [online], [retrieved on Jun. 28, 2022], Retrieved from the Lumecube website using Internet <URL:https://lumecube.com/products/panel-mini>.

* cited by examiner

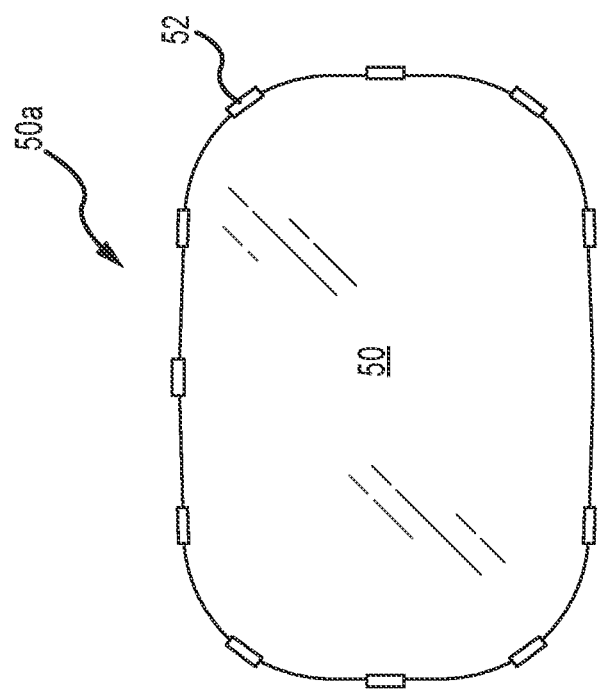
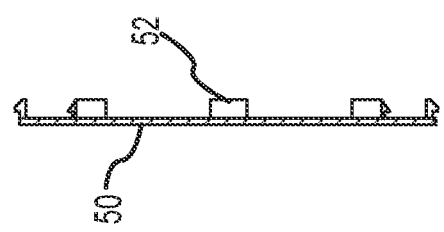
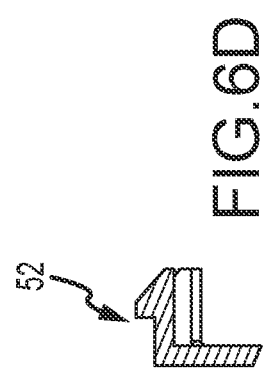
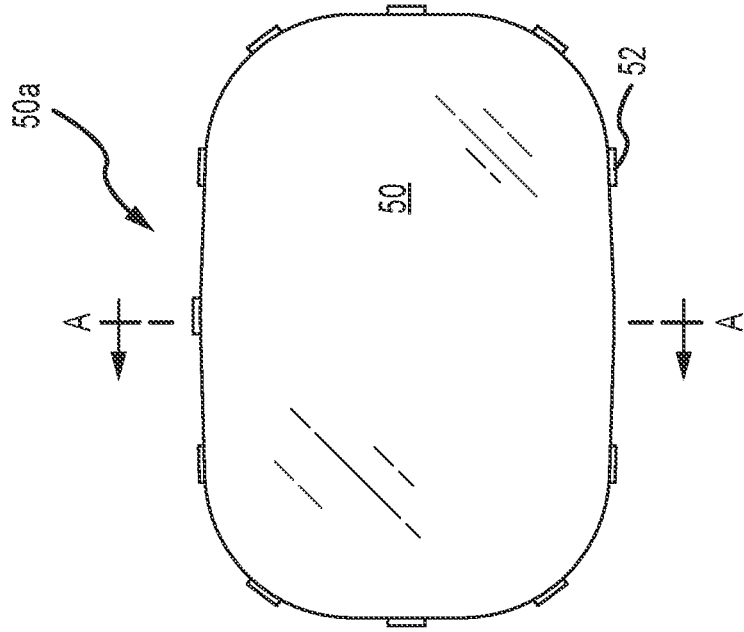

PORTABLE DIFFUSED LIGHTING SYSTEM

CROSS-REFERENCE TO RELATED APPLICATIONS

This patent application is a non-provisional patent application of, and claims the benefit of, U.S. Provisional Patent Application No. 63/129,121, that is entitled "PORTABLE DIFFUSED LIGHTING SYSTEM," that was filed on 22 Dec. 2020, and the entire disclosure of which is hereby incorporated by reference herein.

FIELD

The present disclosure generally relates to the field of lighting and, more particularly, to a portable diffused lighting system used in conjunction with a computer (e.g., for video calls).

BACKGROUND

The onset of the Covid-19 epidemic forced millions of people to be quarantined to their homes. Daily business began to be increasingly conducted in homes using various video conferencing platforms. Despite the benefits of these video conferencing platforms, video conference calls require environmental conditions to be ideal, such as ambient noise levels, ambient lighting, camera positioning, and the like.

SUMMARY

A portable diffused lighting system is presented herein. Both the configuration of such a portable diffused lighting system and the use/operation of such a portable diffused lighting system are within the scope of this Summary.

A portable diffused lighting system includes a collapsible containment and a light source. The containment includes a perimeter wall, a first end, and a light diffuser, with the first end including the light diffuser, and with the containment being disposable in a collapsed configuration and at least one expanded configuration. The light source projects within an interior of the collapsible containment, and diffused light may be output from the containment via the light diffuser. In one aspect, a maximum expanded configuration for the containment providing a maximum spacing of no more than about 4 inches between the light source and the light diffuser. In another aspect, the portable diffused lighting system further includes a cable assembly that incorporates a USB port that is available for use (e.g., by a peripheral) when the cable assembly is interconnected with a USB port of a computer (e.g., such that the computer powers the light source). These aspects may of course be used in combination.

Various aspects of the present disclosure are also addressed by the following examples and in the noted combinations. It should be noted that the subject matter of examples 2-42 may also be used by example 43, including in the combinations set forth with regard to example 1:

1. A portable diffused lighting system, comprising:
   a collapsible containment comprising a perimeter wall, a first end, and a light diffuser, wherein said first end comprises said light diffuser, and wherein said containment comprises a collapsed configuration and a first expanded configuration;
   a light source that projects within an interior of said collapsible containment, wherein said first expanded configuration provides a maximum spacing between said light source and said light diffuser, and wherein said maximum spacing is no more than about 4 inches.

2. The lighting system of example 1, wherein said perimeter wall is opaque.

3. The lighting system of any of examples 1-2, wherein said perimeter wall is a plastic material.

4. The lighting system of any of examples 1-3, wherein said perimeter wall comprises a bellows.

5. The lighting system of any of examples 1-4, wherein said containment is incrementally expandable from said collapsed configuration to said first expanded configuration.

6. The lighting system of any of examples 1-5, wherein said containment is expandable throughout a range to change a distance between said light source and said light diffuser, and wherein said range extends from about 20 mm to about 80 mm.

7. The lighting system of any of examples 1-5, wherein said collapsible containment comprises a second expanded configuration, wherein said first expanded configuration provides a first spacing between said light source and said light diffuser that is equal to said maximum spacing, wherein said second expanded configuration provides a second spacing between said light source and said light diffuser, and wherein said second spacing is less than said first spacing.

8. The lighting system of example 7, wherein said second spacing is at least about 0.75 inch.

9. The lighting system of any of examples 7-8, wherein each of said first expanded configuration and said second expanded configuration are predefined increments in relation to said first spacing and said second spacing, respectively.

10. The lighting system of any of examples 7-9, wherein said collapsible containment comprises a third expanded configuration, wherein said third expanded configuration provides a third spacing between said light source and said light diffuser, and wherein said third spacing is less than said first spacing and is different from said second spacing.

11. The lighting system of example 10, wherein said second spacing is between said first spacing and said third spacing, and wherein said third spacing is at least about 0.75 inch.

12. The lighting system of any of examples 10-11, wherein said third expanded configuration is a predefined increment in relation to said third spacing.

13. The lighting system of any of examples 10-12, wherein said first spacing is about 2.7 inches, said second spacing is about 1.8 inches, and said third spacing is about 0.95 inches.

14. The lighting system of any of examples 10-13, wherein for a fixed output from said light source, an amount of light at 22 inches from said light diffuser is at least 10% less with said containment being in said second expanded configuration compared to said third expanded configuration, and wherein the amount of light at 22 inches from said light diffuser is at least 10% less with said containment being in said first expanded configuration compared to said second expanded configuration.

15. The lighting system of any of examples 1-14, wherein said light diffuser comprises a translucent material.

16. The lighting system of any of examples 1-15, wherein said light diffuser has a light transmission of no more than 80% and a Haze of at least 75%.

17. The lighting system of any of examples 1-16, wherein said light diffuser is rectangular in a plane that is orthogonal to a spacing between said light source and said light diffuser.

18. The lighting system of any of examples 1-17, wherein a width of said light diffuser is greater than a height of said light diffuser.

19. The lighting system of example 18, wherein said width is within a range from about 100 mm to about 200 mm and said height is within a range from about 80 mm to about 150 mm.

20. The light system of any of examples 18-19, wherein said width is no more than about 200 mm and said height is no more than about 150 mm.

21. The light system of any of examples 18-20, wherein said width is about 130 mm and said height is about 87 mm.

22. The lighting system of any of examples 1-21, wherein said light diffuser has a surface area within a range of about 800 sq. mm to about 2,000 sq. mm.

23. The lighting system of any of examples 1-16, further comprising a second light diffuser that is located between and spaced from each of said light diffuser and said light source.

24. The lighting system of any of examples 1-23, wherein said maximum spacing is at least one of no more than about 3 inches and no more than about 2.75 inches 25. The lighting system of any of examples 1-24, wherein said light source comprises a plurality of LEDs.

26. The lighting system of any of examples 1-24, wherein said light source comprises a plurality of LED pairs.

27. The lighting system of any of examples 1-26, wherein said light source is configured to output a plurality of different, pre-set light outputs.

28. The lighting system of any of examples 1-27, further comprising a mounting clip interconnected with said containment and detachably connectable to a first structure.

29. The lighting system of example 28, wherein said mounting clip is of a clothespin-type configuration.

30. The lighting system of any of examples 28-29, wherein said mounting clip comprises first and second legs, a pivotal connection between said first and second legs, and a biasing member, wherein said first and second legs each comprise a clamping section on one side of said pivotal connection and an actuation section on an opposite side of said pivotal connection, wherein moving said actuation sections of said first and second legs toward one another increases a spacing between said clamping sections of said first and second legs, and wherein said biasing member biases said clamping sections of said first and second legs toward one another.

31. The lighting system of example 30, further comprising a boom stand, wherein said boom stand comprises a mounting flange, and wherein said clamping sections of said first and second legs of said mounting clip detachably engage said mounting flange.

32. The lighting system of any of examples 28-31, wherein said containment comprises one of a ball and a socket, and said mounting clip comprises the other of said ball and said socket.

33. The lighting system of any of examples 28-30, further comprising a boom stand, wherein said containment comprises one of a ball and a socket, wherein said boom stand comprises the other of said ball and said socket to detachably connect said containment directly with said boom stand.

34. The lighting system of example 33, wherein said mounting clip also comprises the other of said ball and said socket.

35. The lighting system of any of examples 28-34, wherein said mounting clip is configured for detachable connection to a thickness dimension of a computer display panel.

36. The lighting system of any of examples 28-35, wherein said mounting clip is detachably connectable to said containment.

37. The lighting system of any of examples 10-14:

wherein when said containment is in said first expanded configuration and said light source is being operated to generate a maximum light output, said lighting system outputs about 400 LUX;

wherein when said containment is in said second expanded configuration and said light source is being operated to generate a maximum light output, said lighting system outputs about 440 LUX; and wherein when said containment is in said third expanded configuration and said light source is being operated to generate a maximum light output, said lighting system outputs about 480 LUX.

38. The lighting system of any of examples 1-37, further comprising:

a first USB cable extending from said light source to a first USB plug, wherein said first USB plug comprises a USB connector.

39. The lighting system of example 38, wherein said first USB plug comprises a USB port.

40. The lighting system of example 38, further comprising:

a second USB cable extending from said first USB plug to a second USB plug, wherein said second USB plug comprises a USB port.

41. A computer system comprising:

a computer; and the lighting system of any of examples 38-40, wherein said connector of said first USB plug is disposed in a USB port of said computer.

42. A computer system comprising:

a computer comprising a display panel; and the lighting system of any of examples 1-37, wherein the lighting system is detachably mounted to said display panel by a first member that engages one side of said display panel and a second member that engages an opposite side of said display panel.

43. A portable diffused lighting system, comprising:

a collapsible containment comprising a perimeter wall, a first end, and a light diffuser, wherein said first end comprises said light diffuser, wherein said containment comprises a collapsed configuration and a first expanded configuration;

a light source that projects within an interior of said collapsible containment; and a cable assembly comprising a first USB cable extending from said light source to a first USB plug, wherein said cable assembly further comprises a first USB port, and wherein said first USB plug comprises a USB connector.

44. The lighting system of example 43, wherein said first USB plug comprises said first USB port.

45. The lighting system of example 43, further comprising:

a second USB cable extending from said first USB plug to a second USB plug, wherein said second USB plug comprises said first USB port.

BRIEF DESCRIPTION OF THE DRAWINGS

FIG. 6B is a front view of the front light diffuser shown in FIG. 6A.

FIG. 6C is a cross-sectional view of the front light diffuser shown in FIG. 6B and taken along line A-A.

FIG. 6D is an enlarged view of the circled portion shown in FIG. 6C.

FIG. 6E is a rear view of the front light diffuser shown in FIG. 6A.

DETAILED DESCRIPTION

Figure 1:
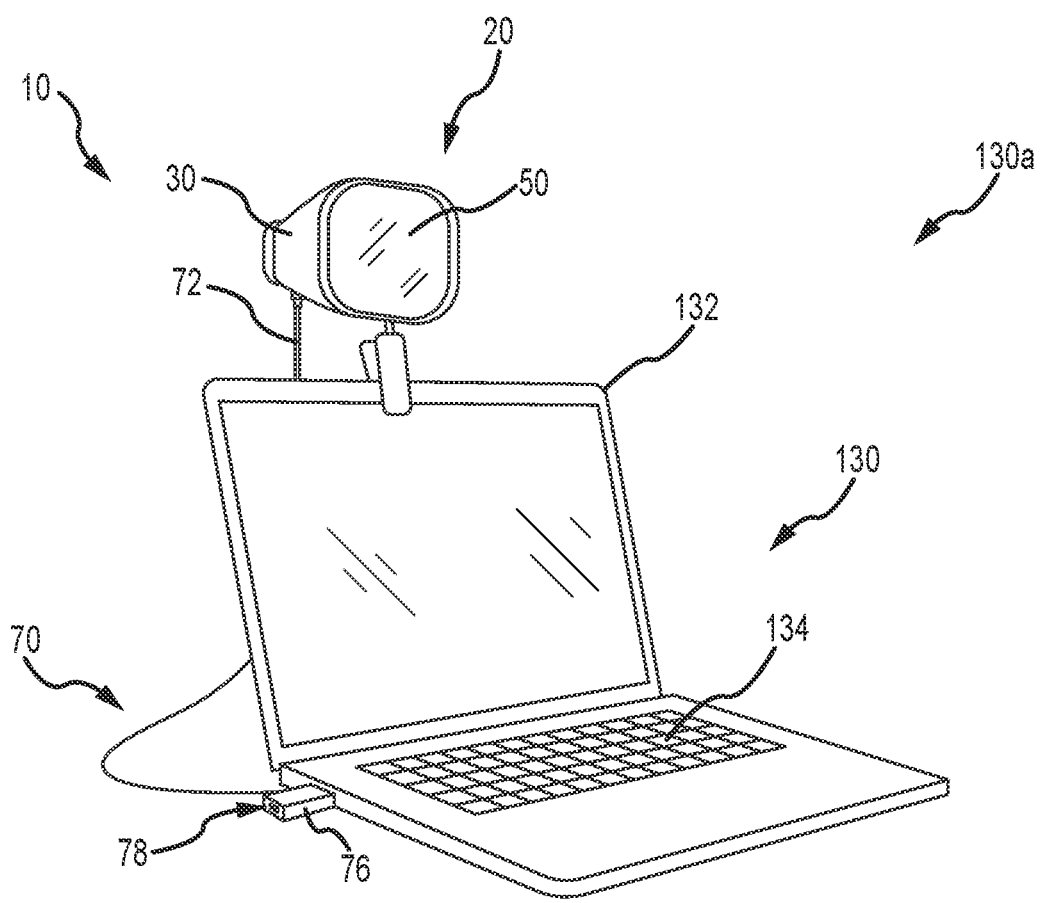
FIG. 1 is a perspective view of one embodiment of a computer system that utilizes a portable diffused lighting system.

One embodiment of a computer system is shown in FIG. 1, is identified by reference numeral 130a, and includes a portable diffused lighting system 10 and a computer 130 that is in the form of a laptop (although any appropriate configuration may be used for the computer 130). Hereafter, the computer 130 will be referred to as a laptop 130. The laptop 130 includes a display panel 132, a keyboard 134, and one or more USB ports. The diffused lighting system 10 is detachably mounted to the display panel 132 of the laptop 130 to provide "soft" light for a laptop user, for instance during video calls, videoconferencing, or the like through the laptop 130. The lighting system 10 is powered by the laptop 130 via a USB cable assembly 70. Generally, a cable 72 of this USB cable assembly 70 extends from a light source for the diffused lighting system 10 and terminates at a USB plug 76. The USB plug 76 includes a connector that is disposed in a USB port of the laptop 130. To accommodate a laptop 130 that has only a single USB port, the USB plug 76 itself includes a USB port 78 such that when the USB cable assembly 70 is being powered by the laptop 130, the laptop 130 will have at least one additional USB port available for use by another computer accessory (namely, the USB port 78).

Various views of the diffused lighting system 10 are shown in FIGS. 2A-2D. Components of the diffused lighting system 10 include a containment, housing, housing assembly, or the like and that is identified by reference numeral 20. The containment 20 includes a sidewall or a perimeter wall 30 that is in the form of an expandable/collapsible structure (e.g., in the form of an accordion or bellows) and that is formed from a material that is both opaque and flexible (e.g., a plastic). An open front end of the containment 20 is closed by a front light diffuser 50 that may be detachably mounted to the containment 20 (e.g., the sidewall 30). The diffused lighting system 10 further includes a mounting clip 90 that extends from the containment 20 (e.g., detachably engaged with the containment 20) and that may detachably engage a suitable structure such as the display panel 132 of the laptop 130.

Figure 2A:
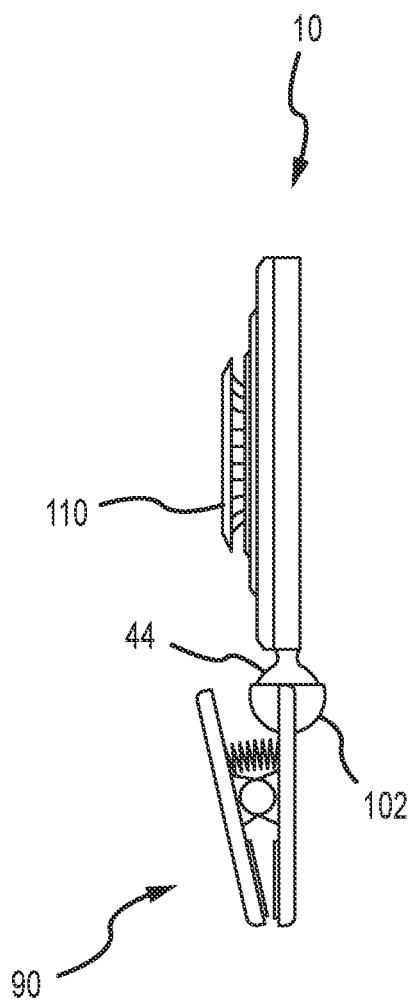
FIG. 2A is a side view of the portable diffused lighting system shown in FIG. 1, in a collapsed or storage configuration.
Figure 2B:
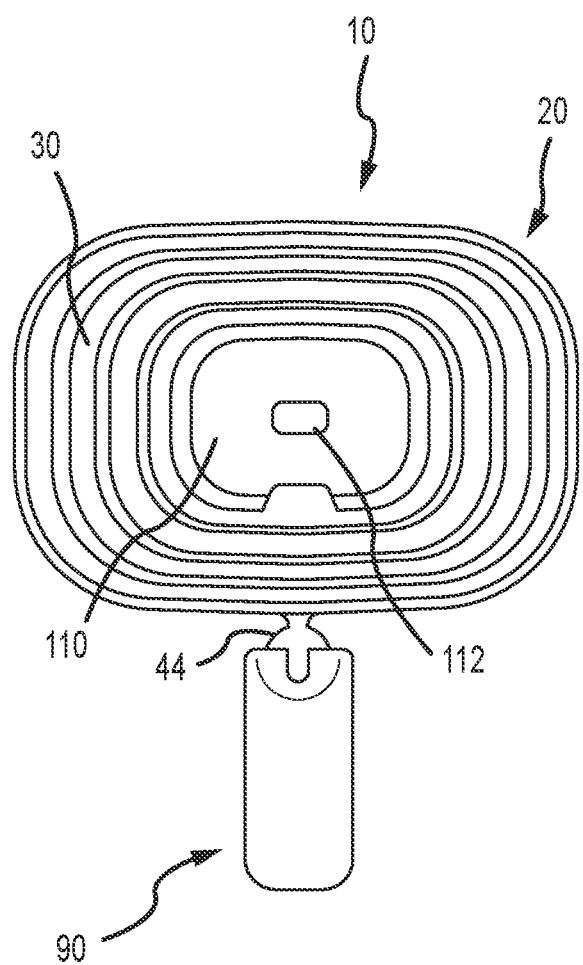
FIG. 2B is a back view of the portable diffused lighting system shown in FIG. 1.
Figures 2C, 2D:
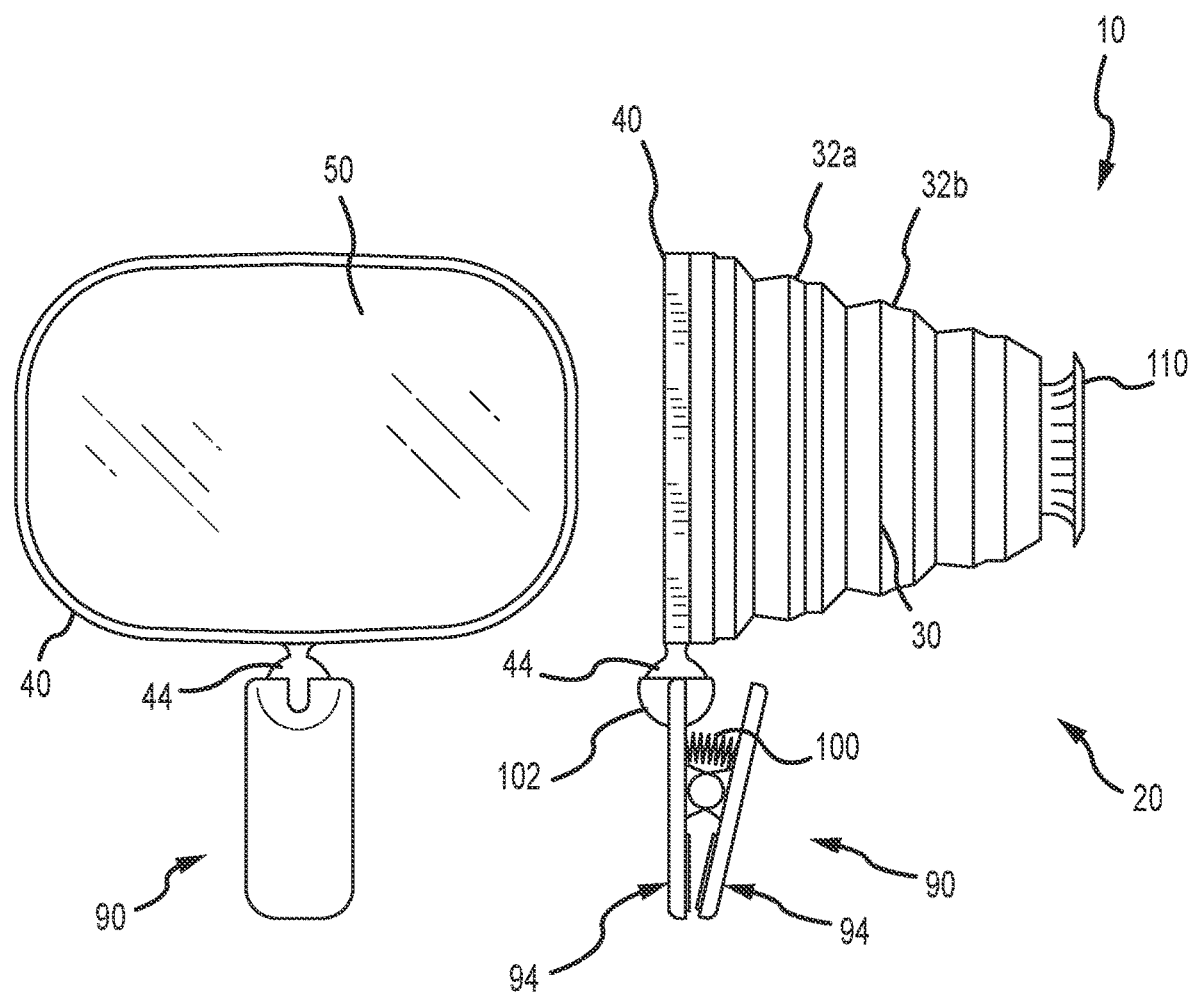
FIG. 2C is a front view of the portable diffused lighting system shown in FIG. 1.
FIG. 2D is a side view of the portable diffused lighting system shown in FIG. 1, in its fully expanded configuration.

As will be discussed in more detail below, the expandable/collapsible containment 20 may be disposed in a number of different expanded configurations (e.g., to provide different spacings between a light source utilized by the diffused lighting system 10 (discussed in more detail below, but disposed within the interior of the containment 20) and the front light diffuser 50. FIG. 2A shows a collapsed or storage configuration for the diffused lighting system 10, while FIG. 2D shows a fully expanded configuration for the diffused lighting system 10. One or more intermediate expanded configurations may be utilized between the fully expanded configuration shown in FIG. 2D and the collapsed/storage configuration shown in FIG. 2A (e.g., by the bellows-like configuration of the sidewall 30 of the containment 20). For instance and referring to FIG. 2D, the containment 20 may be compressed "one increment" from its fully expanded configuration such that the front light diffuser 50 is disposed at expansion increment 32a, may be compressed "two increments from its fully expanded configuration such that the front light diffuser 50 is disposed at expansion increment 32b, or the like. The containment 20 may be configured such that the fully expanded configuration of FIG. 2D, the expansion increments 32a, 32b shown in FIG. 2D, and the collapsed/storage configuration shown in FIG. 2A are predetermined by the bellows-like configuration of the containment 20 (e.g., such that at least a certain amount of force retains the containment 20 in the desired expanded/compressed configuration of the containment 20).

Figure 3:
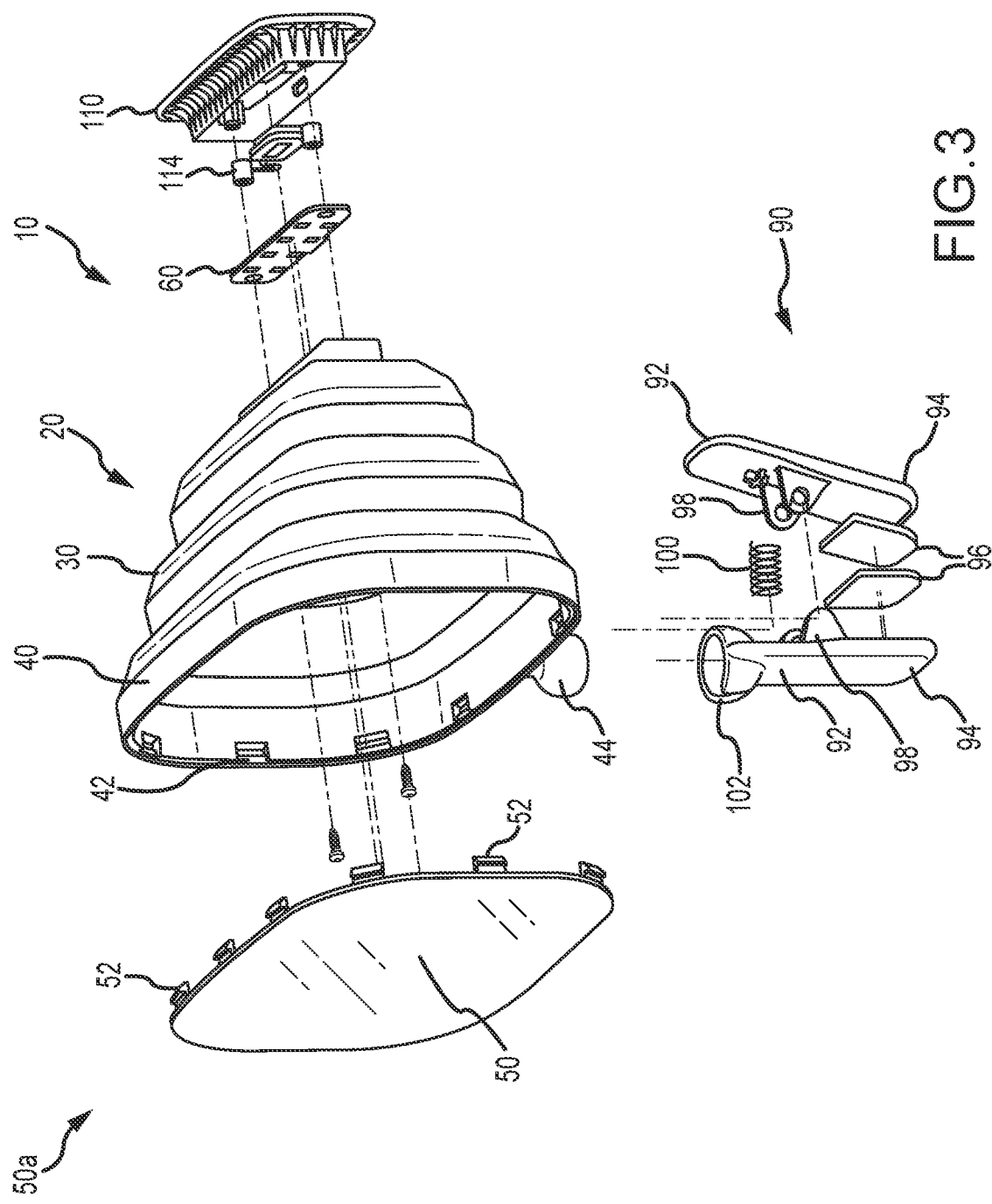
FIG. 3 is an exploded, perspective view of the portable diffused lighting system shown in FIG. 1.

An exploded, perspective view of the containment 20 is illustrated in FIG. 3, and additional views of the containment 20 are also presented in FIGS. 4A-4C and 5A-5D. A front frame 40 of the containment 20 (e.g., FIG. 3 and FIGS. 5A-5C) is appropriately secured to the sidewall 30 of the containment 20, and defines an open, front end for the containment 20. The frame 40 includes a plurality of clips 42 that are disposed about its perimeter and that are on an internal surface of the frame 40 in the illustrated embodiment. A front light diffuser assembly 50a includes the above-noted light diffuser 50 (e.g., FIG. 3 and FIGS. 6A-6D), along with a plurality of clips 52 that are disposed about its perimeter and that extend rearwardly from the light diffuser 50 to detachably engage a corresponding clip 42 of the frame 40 (e.g., via a snap-lock connection). A connector 44 (e.g., a "ball" of a ball-and-socket connection) extends from a bottom edge of the frame 40 to accommodate a detachable/movable connection between the containment 20 and the mounting clip 90.

With continued reference to FIG. 3, the mounting clip 90 includes a pair of legs 92 that are movably interconnected by a pivotal connection 98. Each leg 92 includes a clamping section 94 on one side of the pivotal connection 98. A spring or other biasing member 100 extends between the legs 92 on the opposite side of the pivotal connection 98. Moving the legs 92 toward one another by compressing the spring 100 increases the spacing between the clamping sections 94 on the opposite side of the pivotal connection 98 to install/remove the mounting clip 90 from the display panel 132. Each clamping section 94 may include a pad 96 for interfacing with the display panel 132 of the laptop 130.

The mounting clip 90 also includes a connector 102 (e.g., a socket) for detachably connecting the mounting clip 90 with the containment 20. In the illustrated embodiment, the interconnection between the mounting clip 90 and the containment 20 utilizes a ball and socket configuration that allows for at least some relative movement between the containment 20 and the display panel 132 when the mounting clip 90 is detachably mounted to the display panel 132 (e.g., to adjust the directional output of light from the diffused lighting system 10). The ball and socket configuration also allows the mounting clip 90 to be removed from the containment 20, for instance using a snap-lock configuration or the like. It should be appreciated that the connector 102 for the mounting clip 90 could be the "ball", and that the connector 44 for the containment 20 could be the "socket" for a ball-and-socket configuration.

Figure 7A:
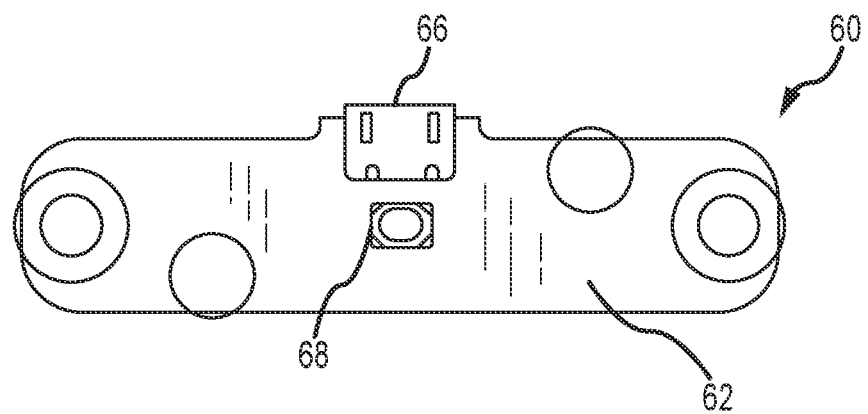
FIG. 7A is a rear view of a printed circuit board assembly for the portable diffused lighting system shown in FIG. 1.
Figure 7B:
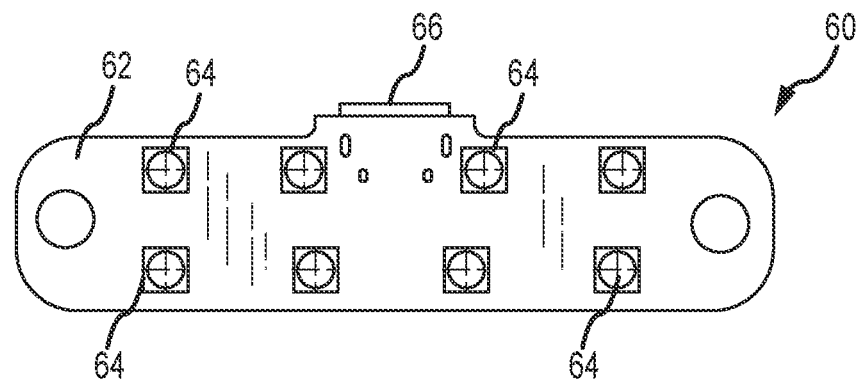
FIG. 7B is a front view of the printed circuit board assembly shown in FIG. 7A and illustrating a plurality of LEDs.

FIGS. 3, 7A, and 7B illustrate a light source for the diffused lighting system 10. A printed circuit board assembly 60 includes a printed circuit board 62, a plurality of LEDs 64, a switch 68, and a USB port 66 (e.g., connectable to a USB connector that extends from a USB plug on an end of the USB cable 72; e.g., USB plug 74 in FIG. 11). Any appropriate number of LEDs 64 may be utilized (eight in the illustrated embodiment). Multiple LEDs 64 may be disposed in any appropriate arrangement. One embodiment allows for selective activation of pairs of LEDs 64. The amount of light output is dependent upon the number of pairs of LEDs 64 that are currently activated and which may be selected through the switch 68 (four different "clicks" of the switch 68 may "scroll" through activating one pair, two pairs, three pairs, and four pairs of LEDS 64 (or in a reverse order) (e.g., the first "click" could be the maximum light output or the minimum light output, such that subsequent clicks decrease or increase, respectively, the light output)). The USB cable assembly 70 connects to the USB port 66 to provide power to the LEDs 64.

Figure 4A:
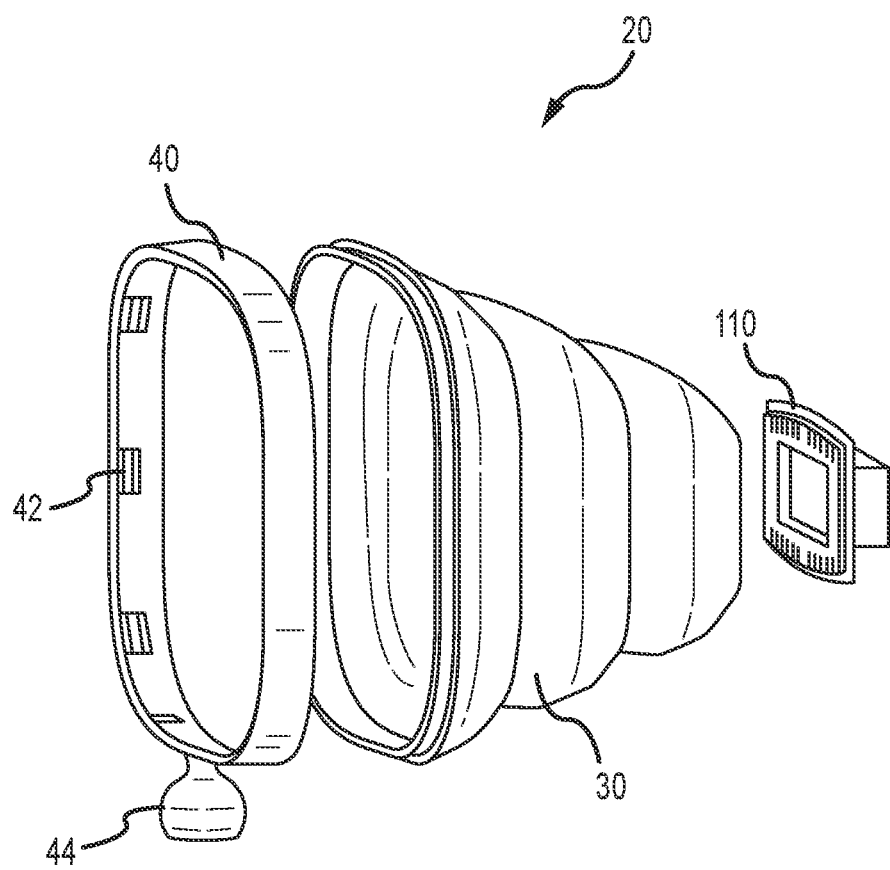
FIG. 4A is an exploded, perspective view of a containment used by the portable diffused lighting system shown in FIG. 1.
Figure 4C:
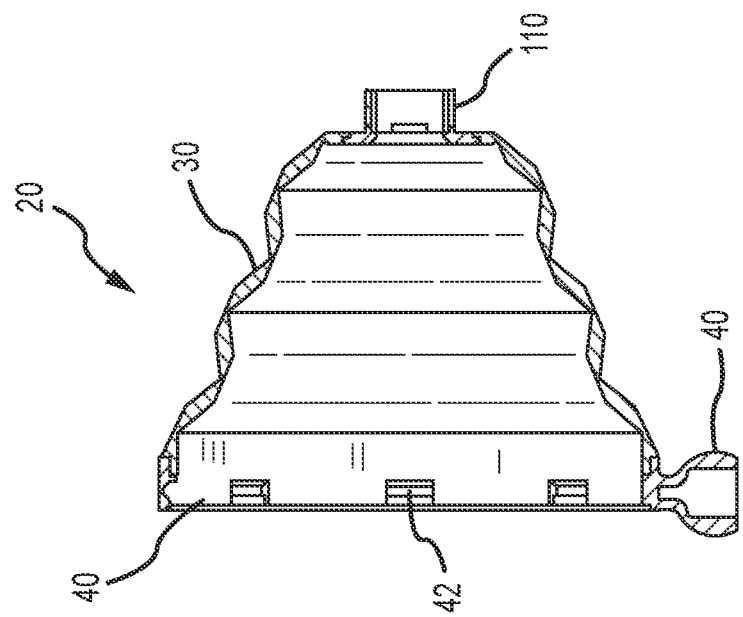
FIG. 4C is a cross-sectional view of the containment shown in FIG. 4B and taken along line A-A.
Figure 4B:
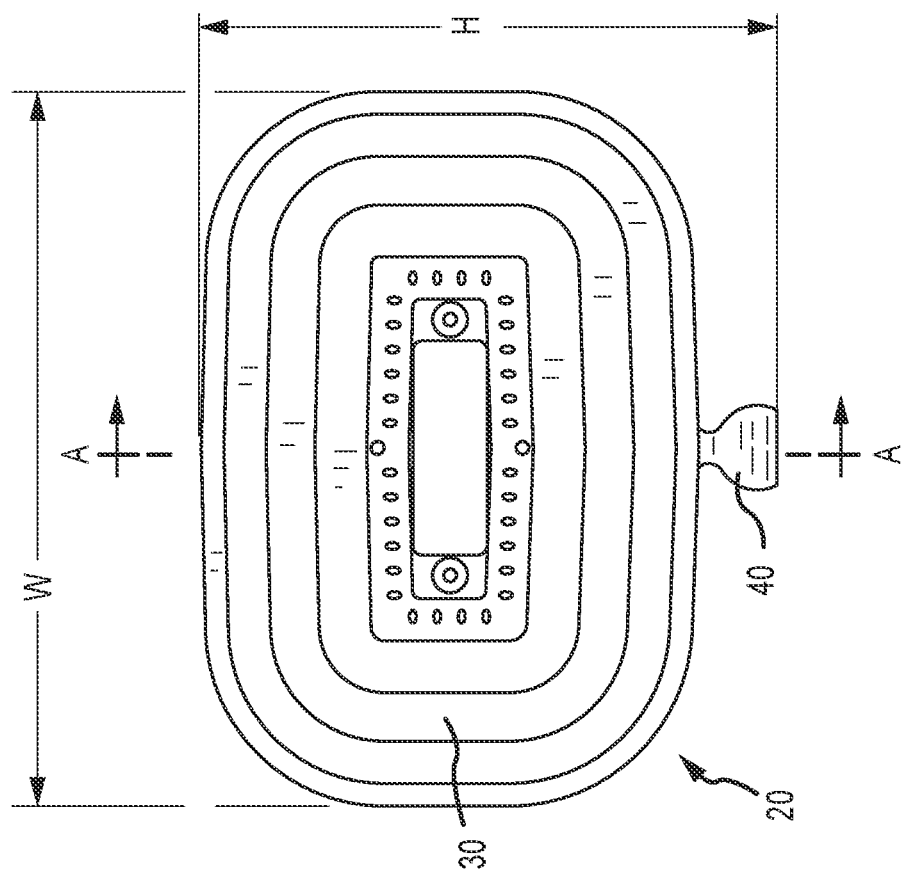
FIG. 4B is a front view of the containment shown in FIG. 4A.
Figure 5A:
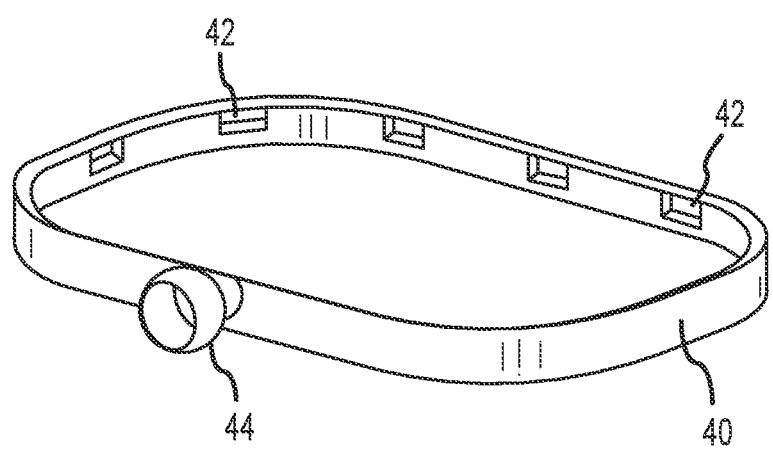
FIG. 5A is a perspective view of a front frame used by the containment shown in FIGS. 4A-4C.
Figure 5D:
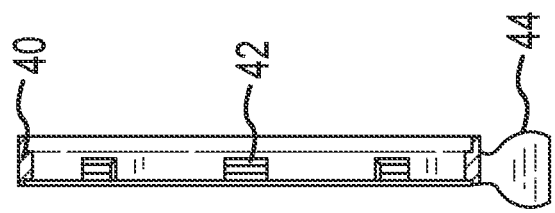
FIG. 5D is a cross-sectional view of the front frame shown in FIG. 5B and taken along line B-B.
Figure 5C:
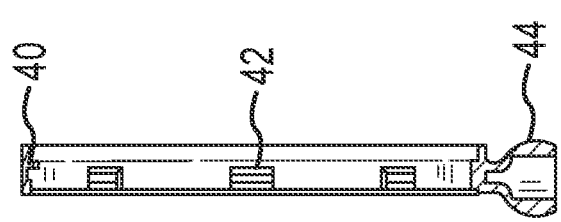
FIG. 5C is a cross-sectional view of the front frame shown in FIG. 5B and taken along line A-A.
Figure 5B:
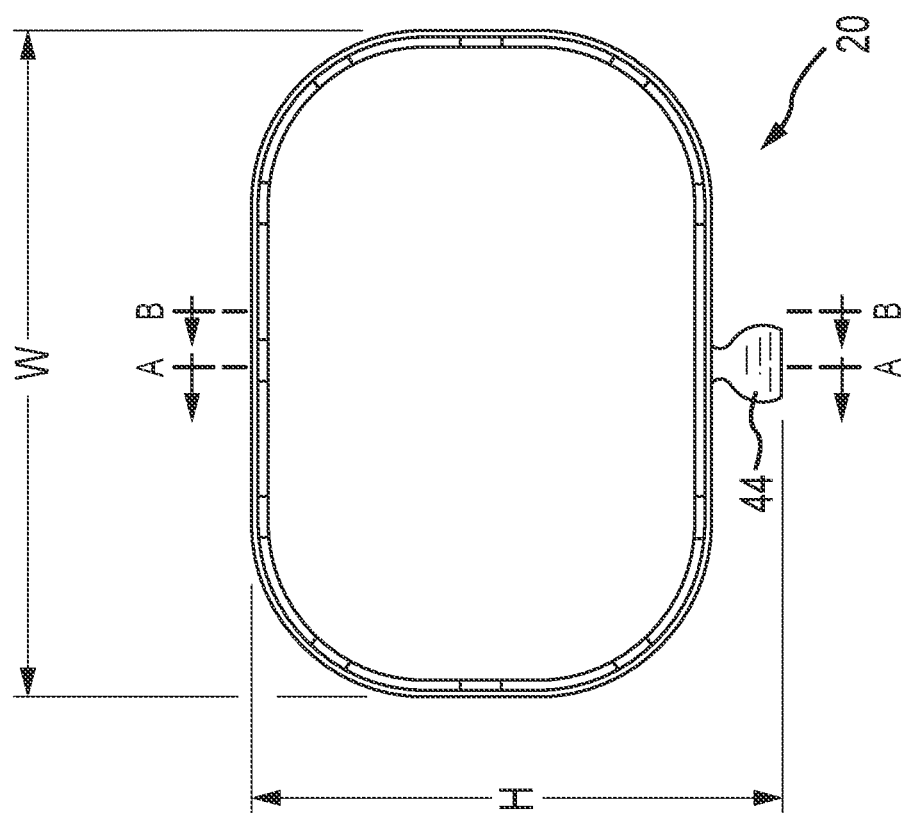
FIG. 5B is a front view of the front frame shown in FIG. 5A.
Figure 6A:
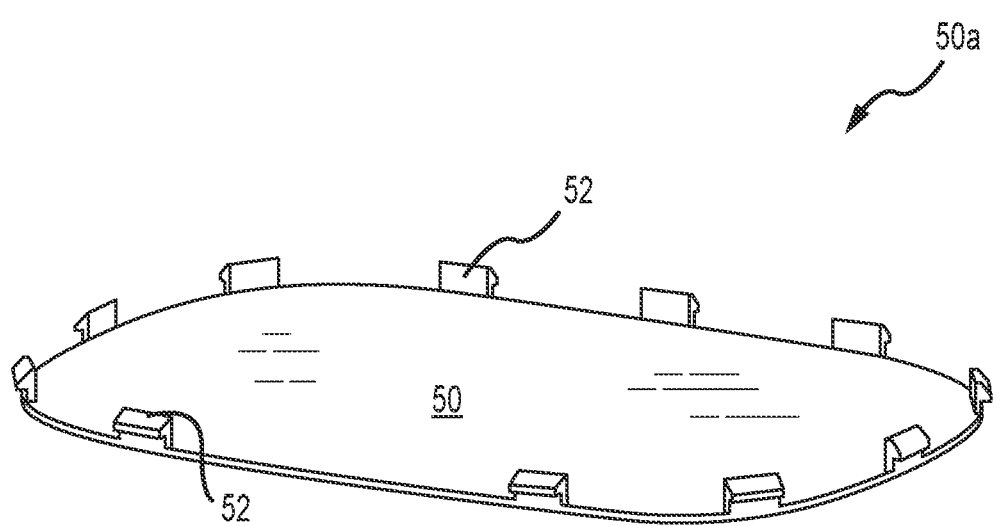
FIG. 6A is a rear, perspective view of a front light diffuser used by/mounted to the containment shown in FIGS. 4A-4C.
Figure 8:
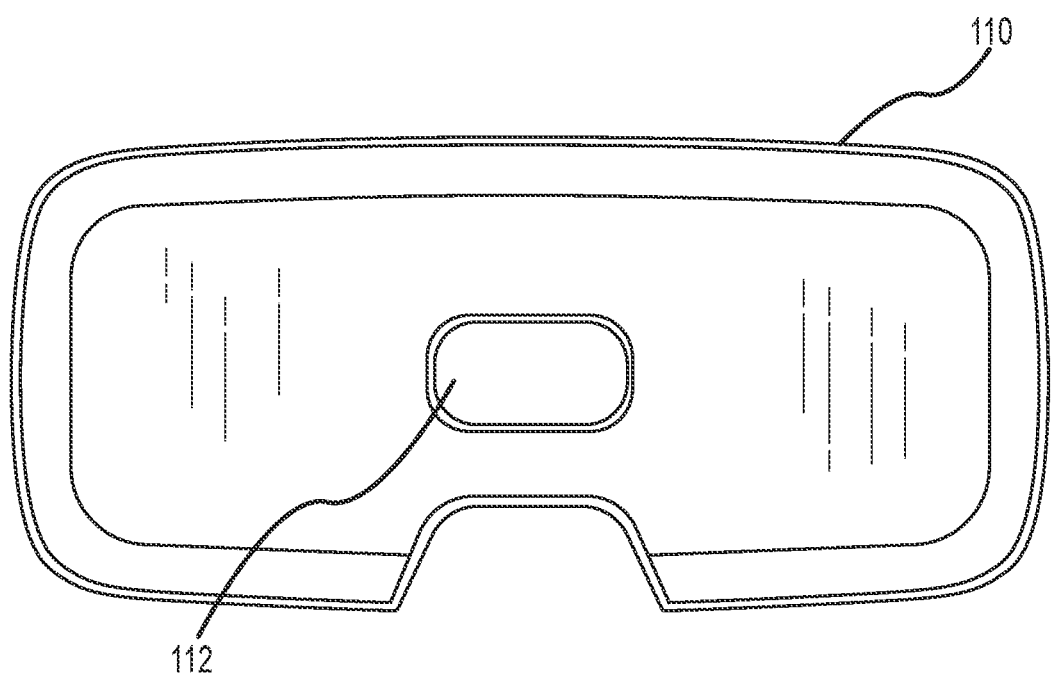
FIG. 8 is a rear view of a rear housing for the containment shown in FIGS. 4A-4C.

FIGS. 3, 4A, and 8 illustrate a rear housing 110 for the containment 20 of the diffused lighting system 10. The rear housing 110 is appropriately mounted to the sidewall 30 at a rear end of the containment 20 (the rear end of the containment 20 being disposed opposite the front light diffuser 50). The printed circuit board assembly 60 may be appropriately secured relative to the rear housing 110. A switch activation zone 112 is incorporated on the exterior of the rear housing 110 and may be deflected for activation of one or more of the LEDs 64. A button tree 114 (FIG. 3) may be disposed between the printed circuit board assembly 60 and the switch activation zone 112 of the rear housing 110 to facilitate activation/deactivation of the LEDs 64 in the above-noted manner.

Figure 9:
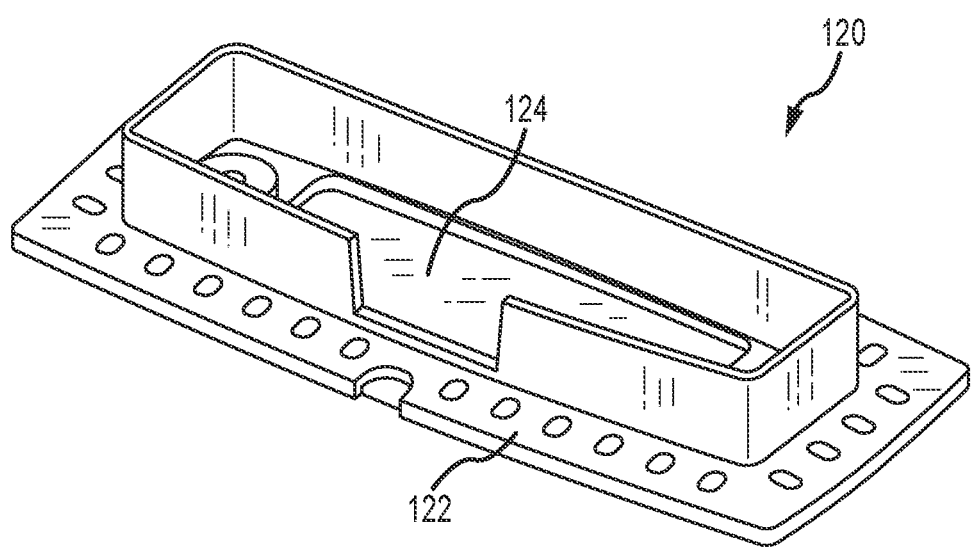
FIG. 9 is a perspective view of an optional rear light diffuser assembly that may be used by the portable diffused lighting system shown in FIG. 1.

The diffused lighting system 10 provides a diffused light output at least based upon utilizing the front light diffuser 50 that is spaced from the LEDs 64, and furthermore having the sidewall 30 of the containment 20 being formed from an opaque material. Light that is output from the LEDs 64 may be diffused by passing through multiple light diffusers. In this regard, a rear light diffuser assembly 120 (FIG. 9) may include a housing 122 that is appropriately secured to the rear housing 110, as well as a rear light diffuser 124 that is disposed between and appropriately spaced from each of the printed circuit board assembly 60 and the front light diffuser 50.

The front light diffuser 50 (as well as the optional rear light diffuser 124) may be in the form of a sheet or film of a translucent material, may have a light transmission of no more than 80% (e.g., ASTM D-1003), a Haze of at least 75% (e.g., ASTM D-1003), or any combination thereof. The spacing between the LEDs 64 and the front light diffuser 50 also contributes to the light diffusion provided by the diffused lighting system 10. The LEDs 64 and the front light diffuser 50 are spaced from one another by at least about 0.75" in one embodiment (including for the collapsed or storage configuration of the diffused lighting system 10/containment 20 shown in FIG. 2A). The spacing between the LEDs 64 and the front light diffuser 50 may be adjustable (via expansion or contraction of the containment 20), and the range of adjustment in one or more embodiments may be at least one of: 1) from about 20 mm to about 80 mm; 2) from about 0.75" to about 2.7"; 3) from about 0.75" to about 3"; and/or 4) from about 0.75" to about 4".

Various features of the diffused lighting system 10 provide a number of benefits, including the above-noted diffused light output and the powering of the LEDs 64 from the laptop 130. The configuration of the front light diffuser 50 (and the optional rear light diffuser 124) is also believed to be advantageous in one or more respects. The front light diffuser 50 is at least generally rectangular (with the front light diffuser 50 being disposed within a plane that is perpendicular/orthogonal to the direction in which the LEDs 64 are spaced from the front light diffuser 50), and also has a width (corresponding with the width of the open end of the containment 20—"W" in FIGS. 4B and 5B) that is of a larger magnitude that a height of the front light diffuser 50 (corresponding with the height of the open end of the containment 20—"H" in FIGS. 4B and 5B). One embodiment has the width of the front light diffuser 50 being within a range from about 100 mm to about 150 mm and the height of the front light diffuser 50 being within a range from about 80 mm to about 100 mm. One embodiment has the width of the front light diffuser 50 being no more than about 200 mm and the height of the front light diffuser 50 being no more than about 150 mm. One embodiment has the width of the front light diffuser 50 being about 130 mm and the height of the front light diffuser 50 being about 87 mm. One embodiment has the front light diffuser 50 having a surface area within a range of about 800 sq. mm to about 2,000 sq. mm.

Portability for the diffused lighting system 10 is accommodated by the containment 20 being collapsible/expandable. The maximum spacing between the front light diffuser 50 and the LEDs 64 (the fully expanded configuration), measured along an axis corresponding with the spacing between the front light diffuser 50 and the LEDs 64, is about 4" in one embodiment, is about 3" in another embodiment, and is about 2.7" in yet another embodiment. This "maximum" spacing again is illustrated in FIG. 2D, and when the containment 20 is disposed in this configuration (as well as when the containment 20 is disposed at the expansion increment 32a or at the expansion increment 32b), the LEDs 64 and the front light diffuser 50 are spaced from one another by at least about 0.75" in one embodiment to provide a desired amount of light diffusion being output by the diffused lighting system 10. In one embodiment, the spacing between the front light diffuser 50 and the LEDs 64, measured along an axis corresponding with the spacing between the front light diffuser 50 and the LEDs 64: 1) is about 2.7" when the containment 20 is in in the fully expanded configuration of FIG. 2D; 2) is about 1.8" when the containment 20 is disposed at the expansion increment 32a shown in FIG. 2D; and 3) is about 0.95" when the containment 20 is disposed at the expansion increment 32b shown in FIG. 2D.

The noted ability to expand and contract/collapse the containment 20 also controls one or more characteristics of the light that is output from the lighting system 10. For instance, when the LEDs 64 are operated to generate a maximum light output: 1) the lighting system 10 outputs about 400 LUX when the containment 20 is disposed in its fully expanded configuration (e.g., FIG. 2D, where the maximum spacing between the front light diffuser 50 and the LEDs 64, measured along an axis corresponding with the spacing between the front light diffuser 50 and the LEDs 64, is about 2.7" in one embodiment); 2) the lighting system 10 outputs about 480 LUX when the containment 20 is disposed in its collapsed or storage configuration (e.g., FIG. 2A, where the spacing between the front light diffuser 50 and the LEDs 64, measured along an axis corresponding with the spacing between the front light diffuser 50 and the LEDs 64, is about 0.75" in one embodiment); and 3) the lighting system 10 outputs about 440 LUX when the containment 20 is disposed at the expansion increment 32b (e.g., FIG. 2D, where the spacing between the front light diffuser 50 and the LEDs 64, measured along an axis corresponding with the spacing between the front light diffuser 50 and the LEDs 64, is about 0.95" in one embodiment).

Figure 10:
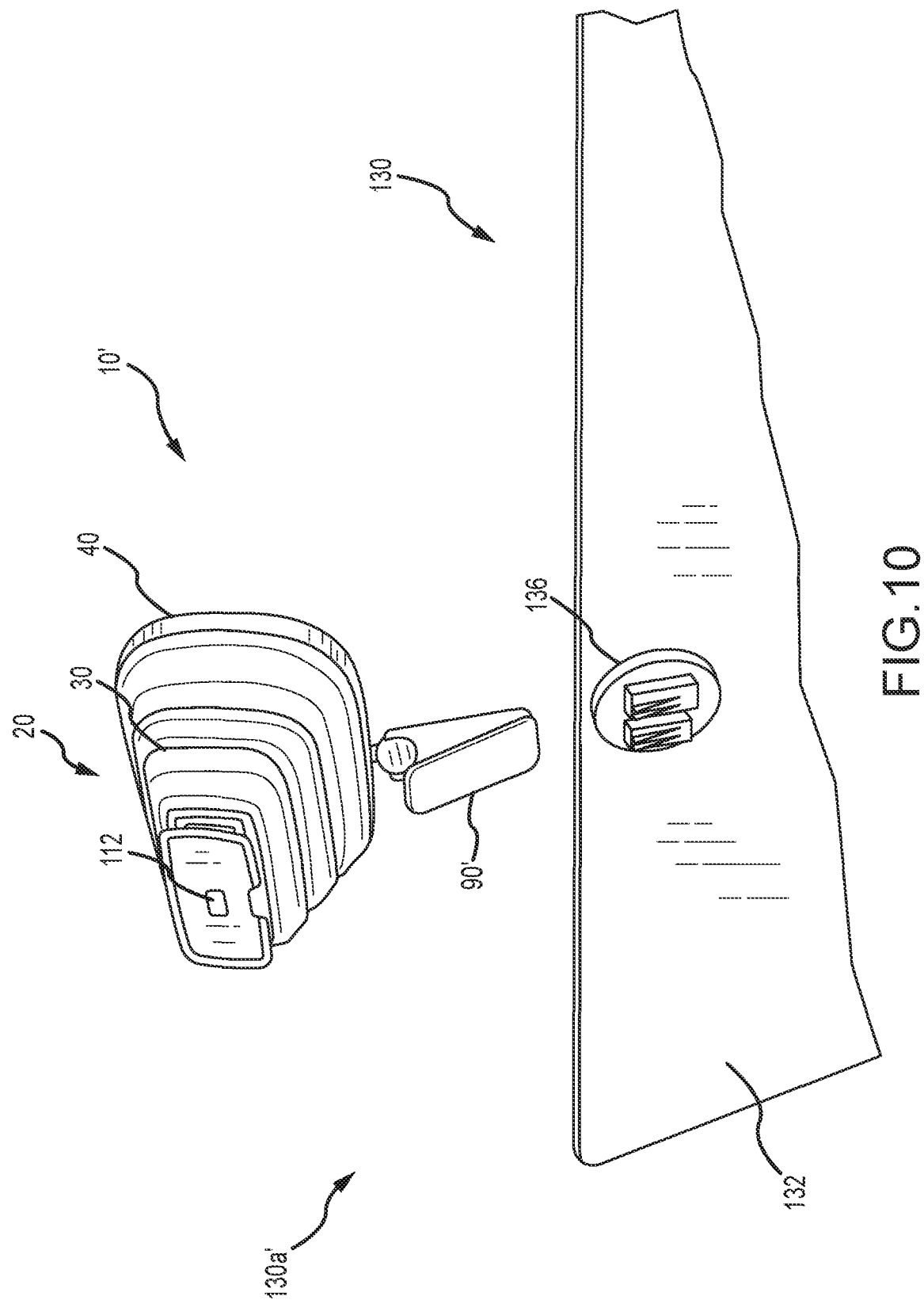
FIG. 10 is a perspective view that shows an alternative connection between a portable diffused lighting system and a laptop.

Other options exist for integrating a portable diffused lighting system 10 with a computer to define a computer system. An embodiment of a computer system is illustrated in FIG. 10 and is identified by reference numeral 130a'. Corresponding components of the computer system 130a' and the foregoing are identified by the same reference numerals, and unless otherwise noted the above-noted discussion remains applicable to those corresponding components. Those components that differ in at least some respect are identified by an "single prime" designation in FIG. 10. The diffused lighting system 10' includes a mounting clip 90' that has a connector on one of its legs 92 for slidably/detachably engaging with a connector 136 that is disposed on a rear wall of the display panel 132. Therefore, in this embodiment the mounting clip 90' does not capture the thickness dimension of the display panel 132 between the clamping sections 94 of its two legs 92.

Figure 11:
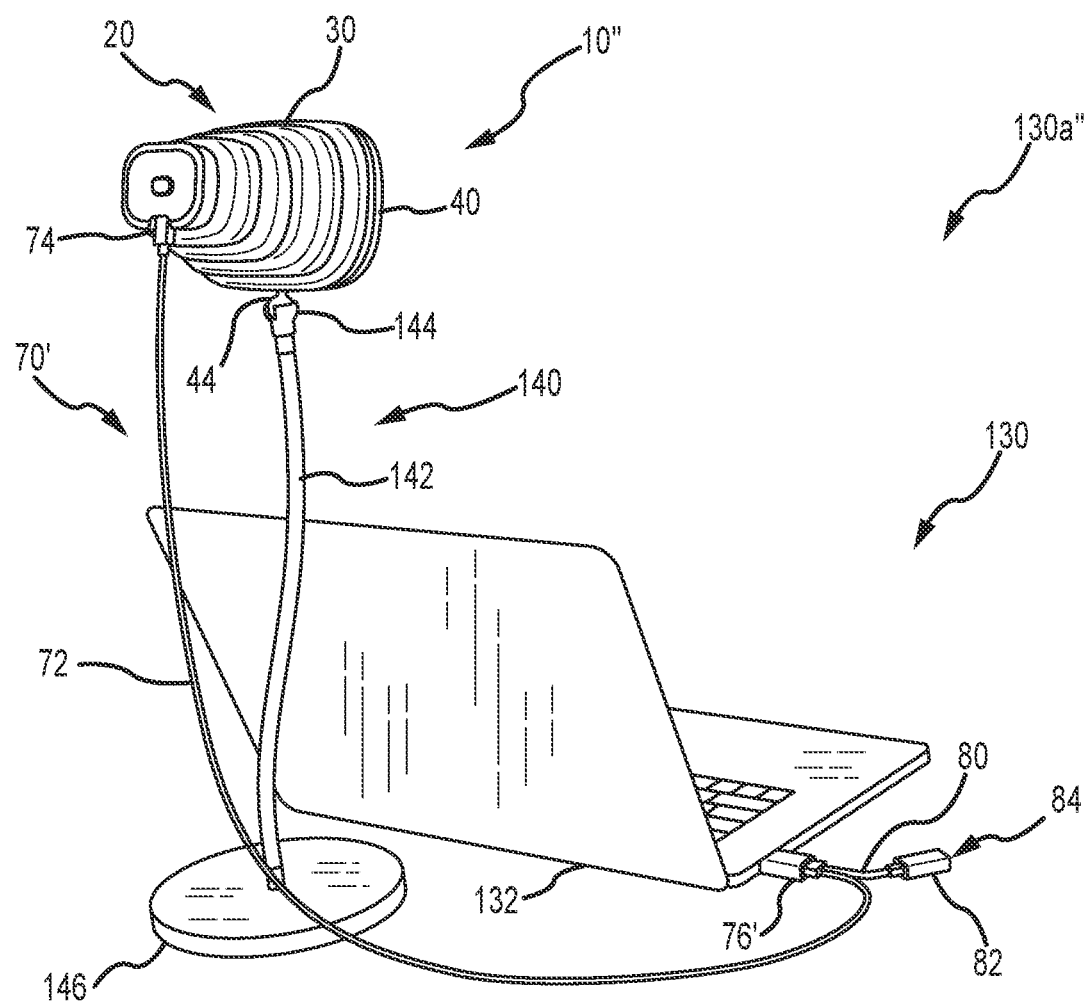
FIG. 11 is a perspective view of another embodiment of a computer system that utilizes a portable diffused lighting system.

Yet another embodiment of a computer system is illustrated in FIG. 11 and is identified by reference numeral 130a". Corresponding components of the computer system 130a" and the foregoing are identified by the same reference numerals, and unless otherwise noted the above-noted discussion remains applicable to those corresponding components. Those components that differ in at least some respect are identified by a "single prime" or "double prime" designation in FIG. 11. The diffused lighting system 10" does not utilize the mounting clip 90 to install the diffused lighting system 10" on the display panel 132 of the laptop 130. Instead, the computer system 130a" uses a boom stand 140 that has a flexible boom 142 and a base 146. The upper/free end of the flexible boom 142 includes a connector 144 that is of the same general configuration as the connector 102 of the mounting clip 90. Interfacing the connector 44 of the containment 20 with the connector 144 of the boom stand 140 detachably connects the diffused lighting system 10" with the boom stand 140. A certain amount of relative movement between the diffused lighting system 10" and the boom stand 140 is available through the interfacing connectors 44, 144. The boom 142 may also be adjusted (e.g., flexed/bent) to change the position/orientation of the containment 20 (or more generally, diffused lighting system 10"), for instance to change the direction of diffused light being output from the diffused lighting system 10". Instead of the upper end of the boom 142 including a connector 144, the upper end of the boom 142 could include a tab, flange, or the like, in which case the mounting clip 90 of the diffused lighting system 10 could detachably engage such a structure.

Figure 12:
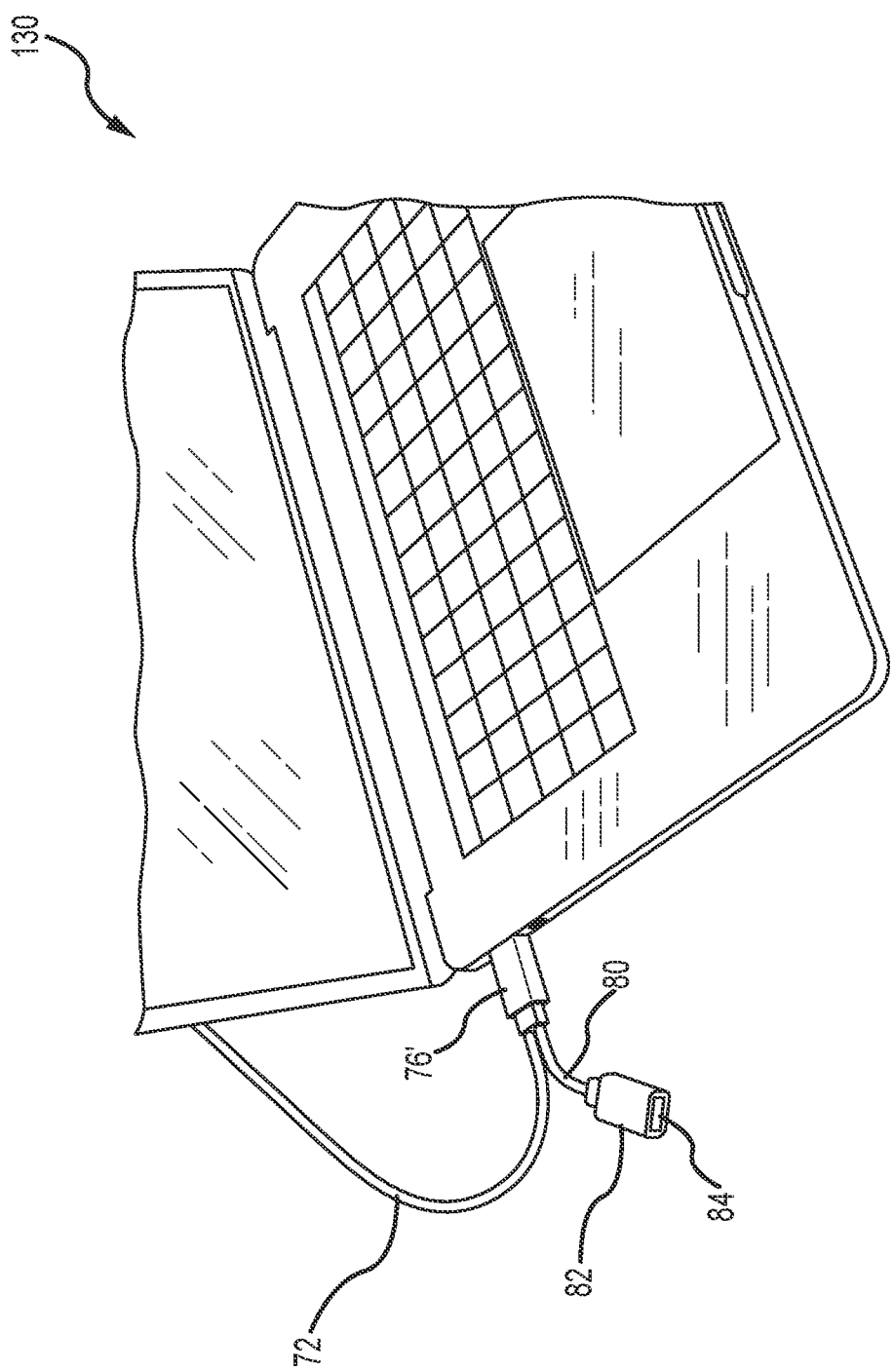
FIG. 12 is a perspective view of another embodiment of a USB cable assembly for powering a portable diffused lighting system from a laptop.

FIGS. 11 and 12 also illustrate an alternative embodiment of a USB cable assembly 70'. Generally, the USB cable assembly 70' includes a modified USB plug 76' that includes a connector that is disposed in a USB port of the laptop 130. The USB cable assembly 70' includes an auxiliary USB cable 80 that extends from the USB plug 76'. A free end of the auxiliary USB cable 80 includes a USB plug 82 having a USB port 84. As such, the USB port 84 of the USB cable assembly 70' provides a USB port 84 to be used in place of the USB port of the laptop 130 that is being used to power the diffused lighting system 10". It should be appreciated that this USB cable assembly 70' may be used with other embodiments described herein.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

What is claimed is:

1. A computer system comprising:
    a computer comprising a display panel; and
    a portable diffused lighting system detachably mounted to said display panel, the portable diffused lighting system comprising:
        a collapsible containment comprising a perimeter wall, a frame, and a light diffuser, wherein said frame defines an open front end, wherein said perimeter wall is secured to said frame, wherein said light diffuser is coupled to said frame and blocks said open front end, and wherein said containment comprises a collapsed configuration and a first expanded configuration; and
        a light source that projects within an interior of said collapsible containment and in the direction of said light diffuser, wherein said first expanded configuration provides a maximum spacing between said light source and said light diffuser, and wherein said maximum spacing is no more than about 4 inches;
    wherein said perimeter wall is opaque; and
    wherein said light diffuser comprises a translucent material.

2. The computer system of claim 1, wherein said perimeter wall comprises a bellows.

3. The computer system of claim 1, wherein said containment is incrementally expandable from said collapsed configuration to said first expanded configuration.

4. The computer system of claim 1, wherein said containment is expandable throughout a range to change a distance between said light source and said light diffuser, and wherein said range extends from about 20 mm to about 80 mm.

5. The computer system of claim 1, wherein said collapsible containment comprises a second expanded configuration, wherein said first expanded configuration provides a first spacing between said light source and said light diffuser that is equal to said maximum spacing, wherein said second expanded configuration provides a second spacing between said light source and said light diffuser, and wherein said second spacing is less than said first spacing.

6. The computer system of claim 1, wherein said light diffuser has a light transmission of no more than 80% and a Haze of at least 75%.

7. The computer system of claim 1, wherein said light diffuser is rectangular in a plane that is orthogonal to a spacing between said light source and said light diffuser.

8. The computer system of claim 1, wherein a width of said light diffuser is greater than a height of said light diffuser.

9. The computer system of claim 8, wherein said width is no more than about 200 mm and said height is no more than about 150 mm.

10. The computer system of claim 1, wherein said light diffuser has a surface area within a range of about 800 sq. mm to about 2,000 sq. mm.

11. The computer system of claim 1, further comprising a second light diffuser that is located between and spaced from each of said light diffuser and said light source.

12. The computer system of claim 1, wherein said maximum spacing is at least one of no more than about 3 inches and no more than about 2.75 inches.

13. The computer system of claim 1, wherein said frame comprises a first connector, wherein said first connector is one of a ball and a socket, wherein said portable diffused lighting system further comprising a mounting clip detachably connectable to said display panel, wherein said mounting clip comprises a second connector, wherein said second connector comprises the other of said ball and said socket, and wherein said second connector is detachably connectable with said first connector.

14. The computer system of claim 13, wherein said mounting clip comprises first and second legs, a pivotal connection between said first and second legs, and a biasing member, wherein said first and second legs each comprise a clamping section on one side of said pivotal connection and an actuation section on an opposite side of said pivotal connection, wherein moving said actuation sections of said first and second legs toward one another increases a spacing between said clamping sections of said first and second legs, and wherein said biasing member biases said clamping sections of said first and second legs toward one another.

15. The computer system of claim 14, further comprising a boom stand, wherein said boom stand comprises a mounting flange, and wherein said clamping sections of said first and second legs of said mounting clip are detachably connectable to said mounting flange.

16. The computer system of claim 13, further comprising a boom stand, wherein said boom stand comprises a third connector, and wherein said third connector is also the other of said ball and said socket to detachably connect said containment directly with said boom stand.

17. The computer system of claim 1, further comprising a boom stand, wherein said frame comprises a first connector, wherein said first connector is one of a ball and a socket, wherein said boom stand comprises a second connector, wherein said second connector is the other of said ball and said socket, and wherein said second connector of said boom stand is detachably connectable to said first connector of said frame.

18. The computer system of claim 13, wherein said mounting clip is configured for detachable connection to a thickness dimension of said display panel.

19. The computer system of claim 1, further comprising:
    a first USB cable extending from said light source to a first USB plug; and
    a second USB cable extending from said first USB plug to a second USB plug, wherein said second USB plug comprises a USB port.

20. The computer system of claim 19, wherein a connector of said first USB plug is disposed in a USB port of said computer.

21. The computer system of claim 1, wherein
    said portable diffused lighting system is detachably mounted to said display panel by a first member that engages one side of said display panel and a second member that engages an opposite side of said display panel.

22. The computer system of claim 1, wherein said light diffuser comprises a plurality of first clips and said frame comprises a plurality of second clips, wherein each first clip of said plurality of first clips detachably engages a corresponding second clip of said plurality of second clips to detachably interconnect said light diffuser with said frame.

* * * * *